(12) United States Patent
Lu (10) Patent No.: US 10,585,488 B2
(45) Date of Patent: Mar. 10, 2020

(54) SYSTEM, METHOD, AND APPARATUS FOR MAN-MACHINE INTERACTION (71) Applicant: BOE TECHNOLOGY GROUP CO., LTD., Beijing (CN)

(72) Inventor: Yongchun Lu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 83 days.

(21) Appl. No.: 15/519,689

(22) PCT Filed: Sep. 9, 2016

(86) PCT No.: PCT/CN2016/098568
§ 371 (c)(1),
(2) Date: Apr. 17, 2017

(87) PCT Pub. No.: WO2017/118075
PCT Pub. Date: Jul. 13, 2017

(65) Prior Publication Data
US 2018/0101237 A1 Apr. 12, 2018

(30) Foreign Application Priority Data
Jan. 4, 2016 (CN) .......................... 2016 1 0004024

(51) Int. Cl.
G06F 3/01 (2006.01)
G02B 27/01 (2006.01)
(Continued)

(52) U.S. Cl.
CPC ............ G06F 3/017 (2013.01); G02B 27/017 (2013.01); G06F 1/163 (2013.01); G06F 3/011 (2013.01);
(Continued)

(58) Field of Classification Search
None
See application file for complete search history.

(56) References Cited

U.S. PATENT DOCUMENTS 8,928,590 B1 1/2015 El Dokor
2014/0201666 A1* 7/2014 Bedikian ................. G06F 3/017
715/771

FOREIGN PATENT DOCUMENTS

CN 103064514 A 4/2013
CN 103295029 A 9/2013
(Continued)

OTHER PUBLICATIONS

International Search Report dated Dec. 9, 2016.
(Continued)

Primary Examiner — Brian M Butcher
(74) Attorney, Agent, or Firm — Dilworth & Barrese, LLP.; Michael J. Musella, Esq.

(57) ABSTRACT

A man-machine interaction system, method, and apparatus, the man-machine interaction system includes a wearable device and a display device. The wearable device includes an image acquiring module, a memory, a processor, an image projecting module, and an information transmission interface. The image acquiring module acquires a current gesture image of a user and a display image on the display device; the processor matches the current gesture image with gestures in a gesture database pre-stored in the memory, determines a gesture category of a matched gesture, determines a control instruction corresponding to the gesture category, and generates a virtual tool image corresponding to the control instruction based on the control instruction; the image projecting module projects a virtual image that includes the virtual tool image and the display image; and the information transmission interface transmits the control instruction to the display device.

18 Claims, 5 Drawing Sheets (51) Int. Cl.
*G06F 1/16* (2006.01)
*G06F 3/03* (2006.01)
*G06F 3/042* (2006.01)

(52) U.S. Cl.
CPC .......... *G06F 3/0304* (2013.01); *G06F 3/0425* (2013.01); *G02B 2027/014* (2013.01); *G02B 2027/0138* (2013.01); *G02B 2027/0178* (2013.01)

(56) References Cited

FOREIGN PATENT DOCUMENTS

| | | |
|---|---|---|
| CN | 103576840 A | 2/2014 |
| CN | 204463032 U | 7/2015 |
| CN | 105045398 A | 11/2015 |
| CN | 105068649 A | 11/2015 |
| CN | 105487673 A | 4/2016 |
| CN | 205485916 U | 8/2016 |
| WO | 2015123771 A1 | 8/2015 |

OTHER PUBLICATIONS

First Chinese Office Action dated Sep. 29, 2016.
Second Chinese Office Action dated Feb. 20, 2017.
Third Chinese Office Action dated Jun. 23, 2017.

\* cited by examiner

SYSTEM, METHOD, AND APPARATUS FOR MAN-MACHINE INTERACTION

TECHNICAL FIELD

The present disclosure relates to the technical field of man-machine interaction, and more particularly to a system, method, and apparatus for man-machine interaction.

BACKGROUND

With the development of electronic information science and technology, an interaction between human and computer plays an important role in people's daily life, wherein it has become a major development trend of man-machine interaction that the man-machine interaction is performed by utilizing the human actions in combination with the virtual reality technique.

As known, when man-machine interaction is performed in conjunction with the virtual reality technique, the user needs to be in direct contact with a computer or issue an operation instruction to the computer with a physical input device. For example, the user performs touch operations on the computer to achieve various functions of the computer, or the user uses a mouse and a keyboard connected to the computer to issue operation instructions to the computer so as to achieve various functions of the computer. However, since the way in which the user needs to use the physical device to operate the computer is relatively complex, it is inconvenient for the user to perform man-machine interaction with the virtual reality technique.

SUMMARY

The present disclosure provides a system, method, and apparatus for man-machine interaction, thus improving operation convenience for the user to perform man-machine interaction with the virtual reality technique.

Accordingly, the present disclosure provides the following technical solutions.

In a first aspect, the present disclosure provides a man-machine interaction system, comprising a wearable device and a display device;

wherein the wearable device includes an image acquiring module, a memory, a processor, an image projecting module, and an information transmission interface;

the image acquiring module is connected to the processor, and configured to acquire a current gesture image of a user and a display image on the display device;

the processor is connected to the memory, and configured to match the current gesture image with gestures pre-stored in a gesture database in the memory, determine a gesture category of a matched gesture, determine a control instruction corresponding to the gesture category, and generate a virtual tool image corresponding to the control instruction based on the control instruction;

the image projecting module is connected to the processor, and configured to project a virtual image that includes the virtual tool image and the display image;

the information transmission interface is connected to the processor, and configured to transmit the control instruction to the display device; and the display device is configured to execute the control instruction upon receipt of the control instruction.

In a second aspect, the present disclosure provides a man-machine interaction method, comprising:

acquiring, by a wearable device, a current gesture image of a user and a display image on a display device;

matching the current gesture image with gestures pre-stored in a gesture database, determining a gesture category of a matched gesture, and determining a control instruction corresponding to the gesture category;

generating a virtual tool image corresponding to the control instruction based on the control instruction, and projecting a virtual image that includes the virtual tool image and the display image on the display device; and transmitting the control instruction to the display device, so that the display device executes the control instruction.

In a third aspect, the present disclosure provides a man-machine interaction apparatus, comprising:

an acquiring module configured to acquire a current gesture image of a user and a display image on the display device;

a determining module configured to match the current gesture image with gestures pre-stored in a gesture database, determine a gesture category of a matched gesture, and determine a control instruction corresponding to the gesture category;

a generating module configured to generate a virtual tool image corresponding to the control instruction based on the control instruction;

a projecting module configured to project a virtual image that includes the virtual tool image and the display image on the display device; and a transmitting module configured to transmit the control instruction to the display device so that the display device executes the control instruction.

In the man-machine interaction system, the man-machine interaction method, and the man-machine interaction apparatus provided in the present disclosure, a current gesture image of a user and a display image on the display device are acquired, the current gesture image is matched with gestures stored in a gesture database, a gesture category of a matched gesture is determined, a control instruction corresponding to the gesture category is determined, a virtual tool image corresponding to the control instruction is generated, a virtual image that includes the virtual tool image and the display image on the display device is projected, and the control instruction is transmitted to the display device to cause the display device to execute the control instruction, thereby achieving the functions corresponding to the control instruction. In comparison to the known solution in which a physical device is required to implement man-machine interaction, the solution of present disclosure can generate control instructions with the user gesture, generate a corresponding virtual tool image, so that the user can view a virtual image that includes a virtual tool image and a display image on the display device, and control the display device by the control instructions to achieve corresponding functions, thus implementing the man-machine interaction with the virtual reality technique without dedicatedly using a physical device to operate the display device, which improves the operation convenience for the user to perform man-machine interaction with the virtual reality technique.

BRIEF DESCRIPTION OF THE DRAWINGS

The accompanying drawings herein constitute a part of the present disclosure for further understanding the present disclosure. The exemplary embodiments of the present disclosure and descriptions thereof illustrate the present disclosure without limiting the scope of the present disclosure in any way. In the drawings.

REFERENCE SIGNS

10—man-machine interaction system, 11—wearable device, 12—display device, 13—lens, 14—glasses frame, 15—virtual pen, 16—smart glasses, 111—image acquiring module, 112—memory, 113—processor, 114—image projecting module, 115—information transmission interface.

DETAILED DESCRIPTION OF THE EMBODIMENTS

Hereinafter, detailed description will be provided in combination with the drawings for further illustrating the man-machine interaction system and the man-machine interaction method according to the embodiments of the present disclosure.

First Embodiment

Figure 1:
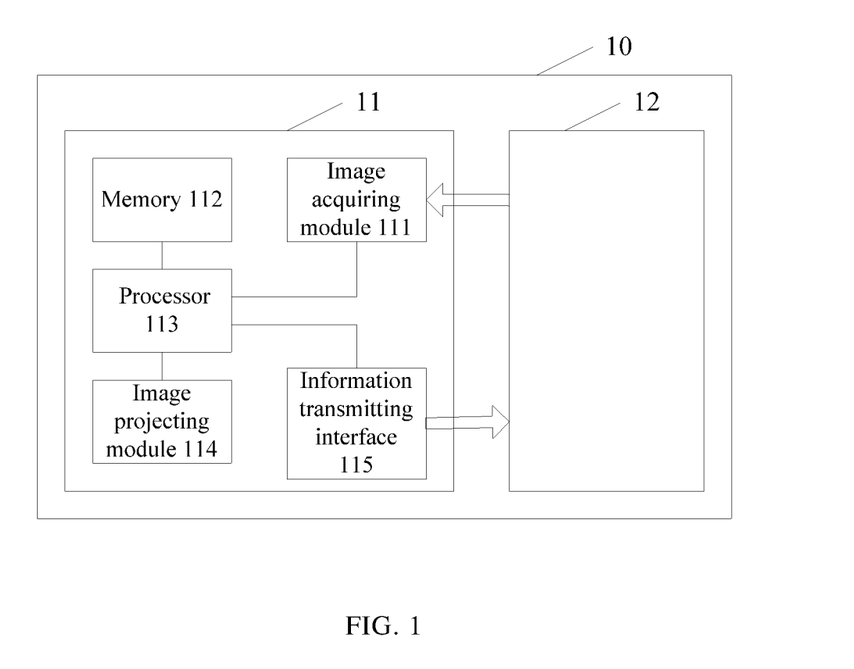
FIG. 1 is a schematic diagram of configuration of a man-machine interaction system in a first embodiment of the present disclosure.

Referring to FIG. 1, the man-machine interaction system 10 provided in an embodiment of the present disclosure comprises a wearable device 11 and a display device 12. The wearable device 11 includes an image acquiring module 111, a memory 112, a processor 113, an image projecting module 114, and an information transmission interface 115. The image acquiring module 111 is connected to the processor 113, and configured to acquire a current gesture image of a user and a display image on the display device 12. Specifically, the image acquiring module 111 can be a camera, a photograph lens, an image sensor, or other components having an image acquiring function. The processor 113 is connected to the memory 112, and configured to match the current gesture image with gestures pre-stored in a gesture database in the memory 112, determine a gesture category of a matched gesture, determine a control instruction corresponding to the gesture category, and generate a virtual tool image corresponding to the control instruction based on the control instruction. The virtual tool image is a virtual display image of a certain tool. It should be noted that a gesture database is stored in the memory 112, and the gesture database includes a plurality of gestures and data associated with the plurality of gestures. In a specific implementation, the gesture database has a self-learning function capable of adding a learned new gesture to the gesture database. The image projecting module 114 is connected to the processor 113, and configured to project a virtual image that includes the virtual tool image and the display image. According to the need in practice, in addition to the virtual image, the image projecting module can also project a current gesture image of the user. The information transmission interface 115 is connected to the processor 113, and configured to transmit the control instruction to the display device 12. The information transmission interface 115 depends on the communication technique between the wearable device 11 and the display device 12. The wearable device 11 and the display device 12 can communicate with each other via a wired connection or a wireless connection. In the case of wireless connection, for example, wireless communication means such as WiFi (Wireless-Fidelity), Bluetooth, ZigBee etc. are used for communication, and the corresponding information transmission interface 115 is adopted. The display device 12 is configured to execute the control instruction upon receipt of the control instruction so as to implement the corresponding function. The function corresponding to the control instruction can be effectuated by the virtual tool. For example, if the virtual tool image corresponding to the control instruction is an image of the virtual pen, then the function, which corresponds to the control instruction, to be realized by the display device is writing and marking function of the virtual pen. Specifically, the wearable device 11 can be smart glasses, wearable helmet, smart bracelet or the like, and the display device 12 can be portable handheld display terminals such as smart phone or tablet computer etc., and no limitations are made here.

In the man-machine interaction system 10 provided in the present disclosure, the image acquiring module 111 acquires a current gesture image of a user and a display image on the display device 12; the processor 113 matches the current gesture image with gestures stored in a gesture database in the memory, determines a gesture category of a matched gesture, determines a control instruction corresponding to the gesture category, and generates a virtual tool image corresponding to the control instruction; the image projecting module 114 projects a virtual image that includes the virtual tool image and the display image; the information transmission interface 115 transmits the control instruction to the display device 12 so that the display device 12 to execute the control instruction, thereby achieving the functions corresponding to the control instructions. In comparison to the known solution in which a physical device is required to implement man-machine interaction, the solution in the present disclosure can generate control instructions with the user gesture, and generate a corresponding virtual tool image, so that the user can view a virtual image that includes a virtual tool image and a display image on the display device, and control the display device 12 to achieve corresponding functions by the control instructions, thus implementing the man-machine interaction with the virtual reality technique without using a physical device to operate the display device 12, which improves operation convenience for the user to perform man-machine interaction with the virtual reality technique.

Second Embodiment

Figure 2:
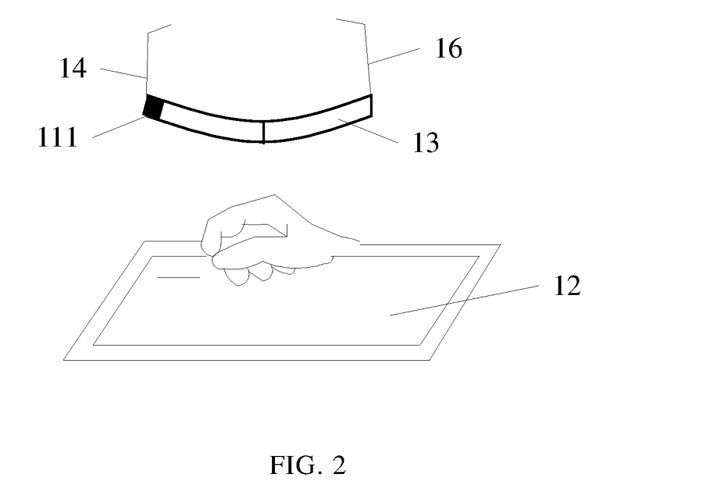
FIG. 2 is a schematic diagram of configuration of a man-machine interaction system in a second embodiment of the present disclosure.

Based on the first embodiment, referring to FIG. 2, description is provided by taking a pair of smart glasses 16 as an example of the wearing device 11. The smart glasses 16 include two lenses 13 corresponding to left and right eyes and a glasses frame 14 for supporting the lenses; wherein the two lenses 13 both are near-to-eye lenses, and both the display image on the display device 12 and the current gesture image of the user can appear to the eyes of the user wearing the smart glasses 16 through the lenses 13. The image projecting module 114 can be integrated in the lenses 13, so that a virtual image that includes the virtual tool image and the display image on the display device can be projected to the eyes of the user, or is displayed directly on the lenses 13, enabling the user to view the virtual image that includes the virtual tool image and the display image on the display device through the smart glasses 16, wherein each of the image acquiring module 11, the memory 112, the processor 113, and the information transmission interface 115 can be arranged on the glasses frame 14 of the smart glasses 16.

Third Embodiment

Figure 3:
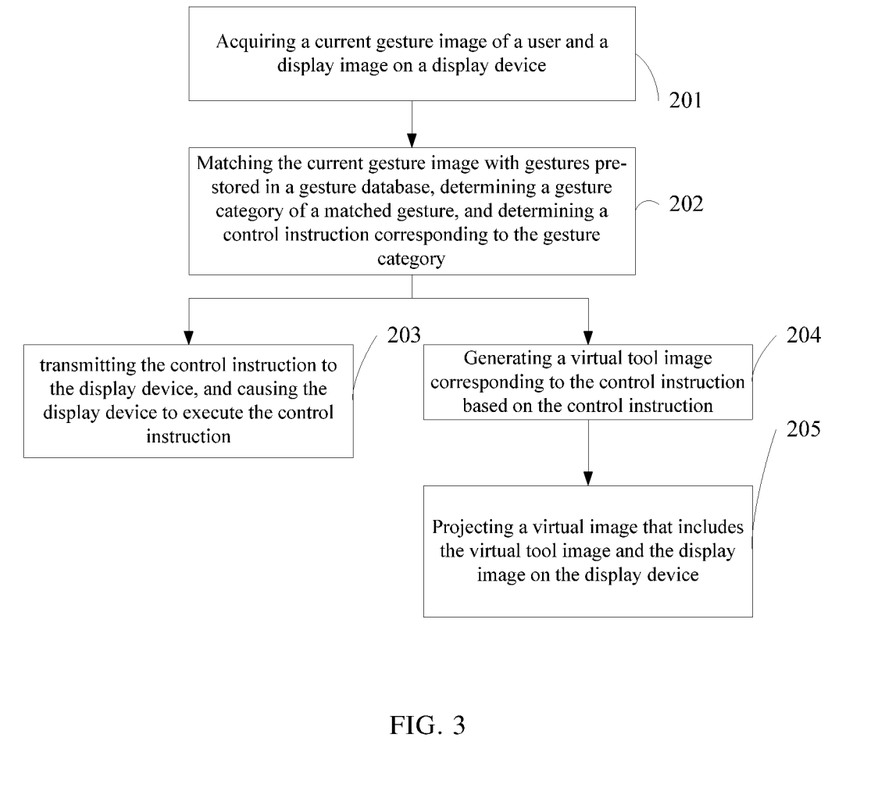
FIG. 3 is a flowchart of a man-machine interaction method in a third embodiment of the present disclosure.

Referring to FIG. 3, this embodiment of the present disclosure further provides a man-machine interaction method. The man-machine interaction method can be applied to the wearable device mentioned in the above embodiment, wherein the wearable device can be smart glasses, wearable helmet, smart bracelet or other devices, and the man-machine interaction method comprises the following steps.

In Step 201, a current gesture image of a user and a display image on a display device are acquired. It should be noted that, what is acquired here is a mixed image of the current gesture image and the display image on the display device, and then the current gesture image and the display image on the display device are separated subsequently.

In Step 202, the current gesture image is matched with gestures pre-stored in a gesture database, a gesture category of a matched gesture is determined, and a control instruction corresponding to the gesture category is determined. It should be noted that, a plurality of gestures are stored in the gesture database, and the current gesture image is matched with gestures in the gesture database to detect whether there is a gesture in the gesture database that is the same as or similar to the current gesture image. A gesture category of the gesture that is the same as or similar to the current gesture image is taken as a gesture category of a gesture that matches with the current gesture image, and different control instructions can be determined for different gesture categories. Specifically, a control instruction corresponding to a gesture category can be generated directly based on the gesture category, or correspondence relationship between the gesture category and the control instruction can be stored in advance, so that a control instruction corresponding to the category of the current gesture can be invoked based on the category of the current gesture.

In Step 203, the control instruction is transmitted to the display device to cause the display device to execute the control instruction. The display device executes the control instruction upon receipt of the control instruction sent from the wearable device, so that the function corresponding to the control instruction is achieved.

In Step 204, a virtual tool image corresponding to the control instruction is generated based on the control instruction. It should be noted that, the control instruction has a corresponding virtual tool, and it is required to form a virtual tool image, that is, an image of the virtual tool, in the wearable device in step 204, wherein the virtual tool here does not have a physical presence, and the user view the generated virtual tool image by the wearable device.

In Step 205, a virtual image that includes the virtual tool image and the display image on the display device is projected. It should be noted that, in addition to the virtual image described above, the image projecting module can also project a current gesture image of the user, so that the user can view the virtual tool image and the display image on the display device, or view the virtual tool image, the display image on the display device, and the current gesture image by the wearable device, and the image projected from the wearable device can be updated in real time based on the current gesture image and the display image on the display device acquired by the wearable device, wherein the wearable device can project a consecutive image.

In the man-machine interaction method provided in the present disclosure, a current gesture image of a user and a display image on the display device are acquired, the current gesture image is matched with gestures stored in a gesture database, a gesture category of a matched gesture is determined, a control instruction corresponding to the gesture category is determined, a virtual tool image corresponding to the control instruction is generated, a virtual image that includes the virtual tool image and the display image on the display device is projected, and the control instruction is transmitted to the display device to cause the display device to execute the control instruction, thereby achieving the functions corresponding to the control instruction. In comparison to the known solution in which a physical device is required to implement man-machine interaction, the solution of present disclosure can generate control instructions with the user gesture, generate a corresponding virtual tool image, so that the user can view a virtual image that includes a virtual tool image and a display image on the display device, and control the display device by the control instructions to achieve corresponding functions, thus implementing the man-machine interaction with the virtual reality technique without dedicatedly using a physical device to operate the display device, which improves the operation convenience for the user to perform man-machine interaction with the virtual reality technique.

Fourth Embodiment

Figure 4:
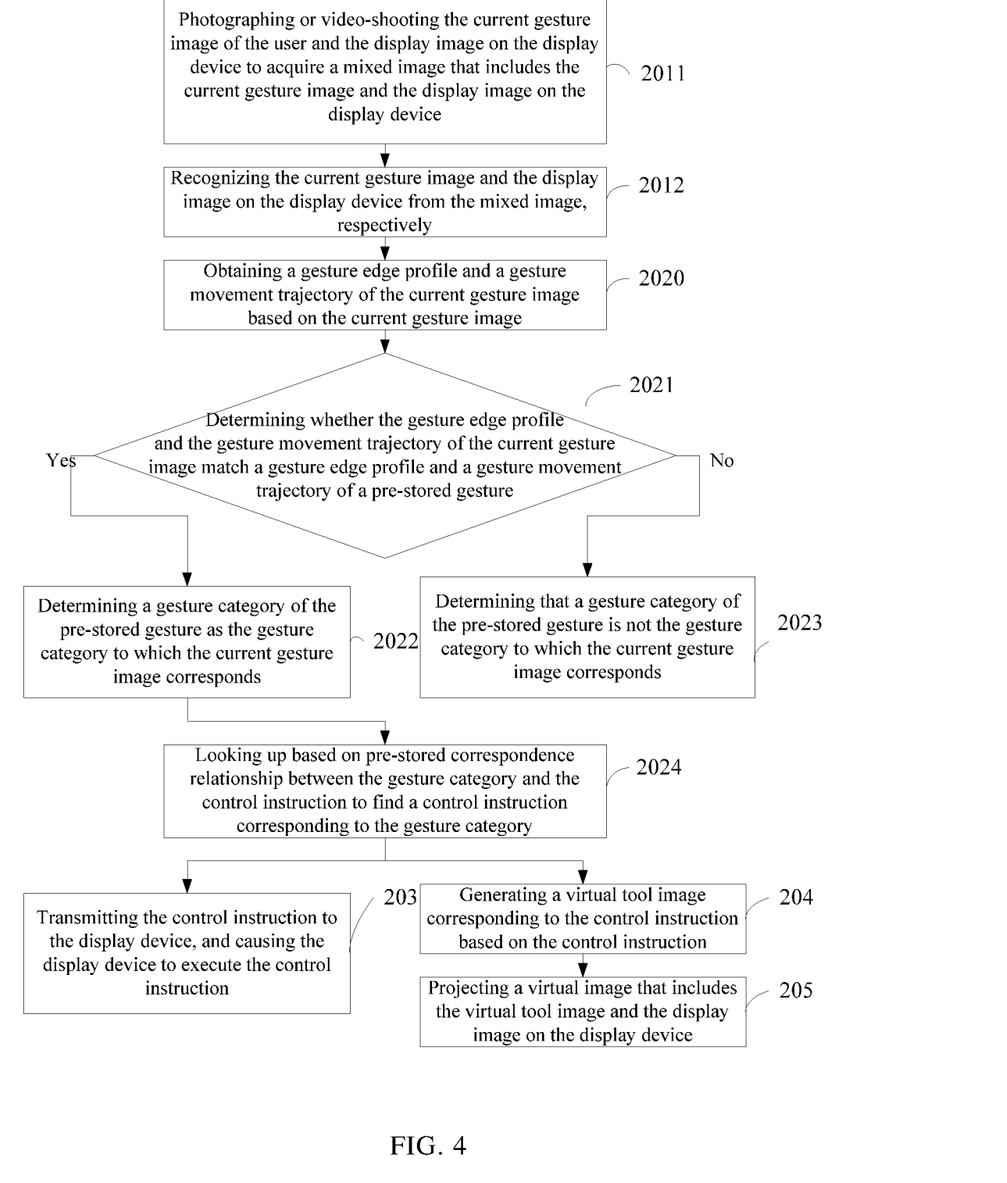
FIG. 4 is a flowchart of a man-machine interaction method in a fourth embodiment of the present disclosure.

Referring to FIG. 4, based on the third embodiment, the step 201 in the third embodiment can be sub-divided into steps 2011 and 2012, and the step 202 in the third embodiment can be sub-divided into steps 2020 to 2024, with the detailed contents as follows.

In Step 2011, the current gesture image of the user and the display image on the display device 12 are photographed or video-shoot to acquire a mixed image that includes the current gesture image and the display image on the display device. Before the user makes a gesture, that is, when the wearable device has not acquired the current gesture image of the user yet, the wearable device first acquires the display image on the display device, so as to obtain a subject environment in which the makes a gesture in a current scenario, step 2012 is executed when the wearable concurrently acquires a mixed image of the current gesture of the user and the display image on the display device; it should be noted that a specific manner of acquiring an image can be photographing or video-shooting.

In Step 2012, the current gesture image and the display image on the display device 12 are recognized from the mixed image. Specifically, the current gesture image and the display image on the display device as contained in the mixed image can be separated by a background separation method, so as to recognize the current gesture image and the display image on the display device.

In Step 2020, a gesture edge contour and a gesture movement trajectory of the current gesture image are obtained based on the current gesture image. A gesture edge contour and a gesture movement trajectory can be obtained from the current gesture image, wherein the gesture edge contour indicates a contour and a concrete shape of the gesture, and the gesture movement trajectory indicates a movement direction and changing process of the gesture. For example, the wearable device acquires a gesture in which the user clenches a solid first and moves the first linearly before the display device, wherein the gesture edge contour indicates that a contour of the hand forming a solid first is a near-circular shape and indicates a shape and a position of each finger of the solid first, and the gesture movement trajectory indicates that the solid first moves linearly. Another example, the wearable device acquires a gesture in which the user clenches a hollow first and moves the first in a curvilinear movement, wherein the gesture edge contour indicates a contour of the hand forming a hollow first is a near-circular shape and indicates a shape and a position of each finger of the hollow first, and the gesture movement trajectory indicates that the hollow first makes curvilinear movement. Since the shape and the position of each finger of the solid first are different from those of the hollow first, it is possible to differentiate the solid first and the hollow first by the gesture edge contour. It should be noted that, features representing a gesture are not limited to the gesture edge contour and the gesture movement trajectory, and features capable of representing a gesture other than the gesture edge contour and the gesture movement trajectory all fall into the protection scope of the present disclosure.

In Step 2021, it is determined whether the gesture edge contour and the gesture movement trajectory of the current gesture image match a gesture edge contour and a gesture movement trajectory of a pre-stored gesture. It should be noted that, gestures in the gesture database also have features such as the gesture edge contour and the gesture movement trajectory, and the gesture edge contour and the gesture movement trajectory of the current gesture image are compared with a gesture edge contour and a gesture movement trajectory of a pre-stored gesture to determine whether there is a match.

In Step 2022, if there is a match, a gesture category of the pre-stored gesture is determined as the gesture category to which the current gesture image corresponds. The gesture category is an attribute of the gesture per se, and used to represent a type of the gesture, for example, an opening gesture category, a marking gesture category, a zoom-in gesture category etc.

In Step 2023, if there is no match, a gesture category of the pre-stored gesture is determined as the gesture category which does not correspond to the current gesture image.

In Step 2024, looking up is made based on pre-stored correspondence relationship between the gesture category and the control instruction to find a control instruction corresponding to the gesture category. It should be noted that correspondence relationship between the gesture category and the control instruction can be stored in advance in the wearable device, and after the gesture category is determined, a control instruction corresponding to the gesture category is found to facilitate invoking.

Fifth Embodiment

Figure 5:
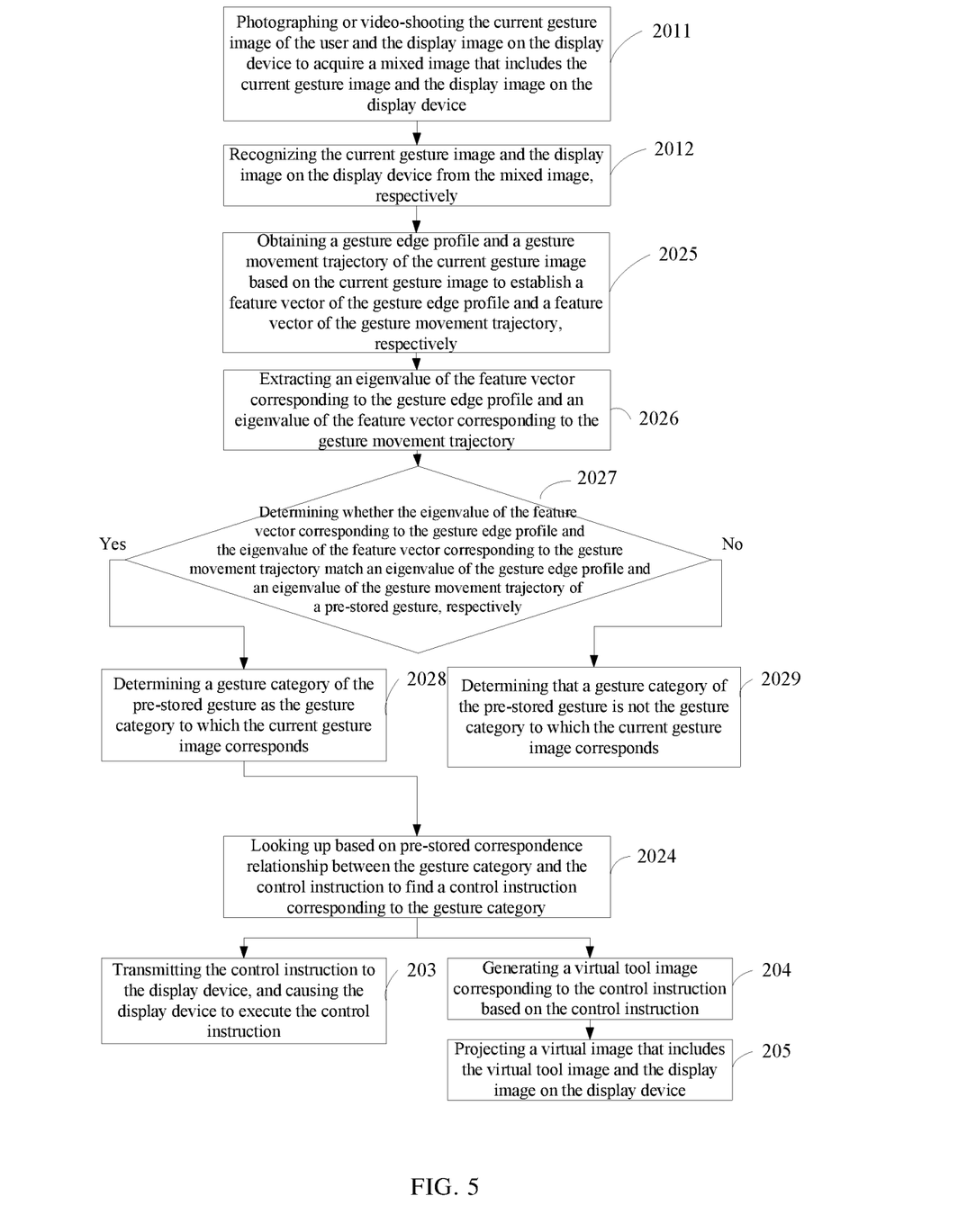
FIG. 5 is a flowchart of a man-machine interaction method in a fifth embodiment of the present disclosure.

Referring to FIG. 5, based on the third and fourth embodiments, the step 202 in the third embodiment can be subdivided into steps 2025 to 2029 and step 2024, and the detailed contents of these sub-divided steps are provided below.

In Step 2025, a gesture edge contour and a gesture movement trajectory of the current gesture image are obtained based on the current gesture image to establish a feature vector of the gesture edge contour and a feature vector of the gesture movement trajectory, respectively. The gesture edge contour has a corresponding feature vector, and the gesture movement trajectory also has a corresponding feature vector.

In Step 2026, an eigenvalue of the feature vector corresponding to the gesture edge contour and an eigenvalue of the feature vector corresponding to the gesture movement trajectory are extracted. The wearable device performs segmentation and eigenvalue extraction on the feature vectors of the gesture edge contour and the feature movement trajectory, to extract eigenvalues of the feature vectors corresponding to the gesture edge contour and the gesture movement trajectory.

In Step 2027, it is determined whether the eigenvalue of the feature vector corresponding to the gesture edge contour and the eigenvalue of the feature vector corresponding to the gesture movement trajectory match an eigenvalue of the gesture edge contour and an eigenvalue of the gesture movement trajectory of a pre-stored gesture, respectively. Specifically, the gesture edge contour and the gesture movement trajectory of a gesture in the gesture database also have feature vectors, and it is determined whether the extracted respective eigenvalues which correspond to the current gesture image are matched with respective eigenvalues corresponding to a gesture in the gesture database; that is to say, it is determined whether the gesture edge contour of the current gesture image matches with the gesture edge contour of a pre-stored gesture, and whether the gesture movement trajectory of the current gesture image matches with the gesture movement trajectory of the pre-stored gesture.

In Step 2028, if there is a match, it is determined that a gesture category of the pre-stored gesture is the gesture category to which the current gesture image corresponds. Specifically, if the gesture edge contour of the current gesture image matches with the gesture edge contour edge of a pre-stored gesture, and the gesture movement trajectory of the current gesture image matches with the gesture movement trajectory of the pre-stored gesture, then it can be determined that the gesture category of the pre-stored gesture is the gesture category to which the current gesture image corresponds.

In Step 2029, if there is no match, it is determined that a gesture category of the pre-stored gesture is not the gesture category to which the current gesture image corresponds. Specifically, if the gesture edge contour of the current gesture image does not match with the gesture edge contour edge of a pre-stored gesture, or if the gesture movement trajectory of the current gesture image does not match with the gesture movement trajectory of the pre-stored gesture, then it can be determined that the gesture category of the pre-stored gesture is not the gesture category to which the current gesture image corresponds.

In Step 2024, looking up is made based on pre-stored correspondence relationship between the gesture category and the control instruction to find a control instruction corresponding to the gesture category. As for the detailed contents, reference can be made to the fourth embodiment, and details will not be repeated here.

Figure 6:
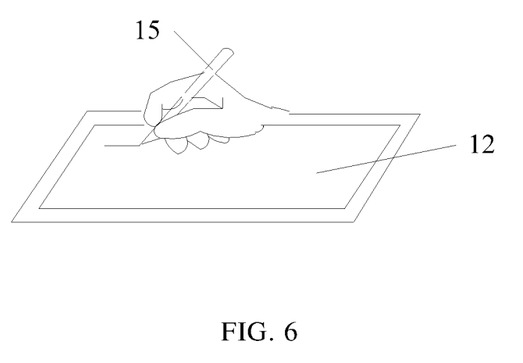
FIG. 6 is a visual effect view of the user in a fifth embodiment of the present disclosure.

The implementation of the man-machine interaction with the man-machine interaction system in this embodiment will be explained below in a specific example. As illustrated in FIG. 2, the smart glasses 16 acquire images with a camera, and the display device 12, which is a tablet computer, displays a text reading interface as a screen image on the tablet computer; the camera of the smart glasses 16 acquires an image of the text reading interface on the tablet computer to obtain the image displayed on the tablet computer. At this time, if the user wants to mark a certain sentence in the text reading interface, he/she makes a pen-hold gesture so as to make a mark at a position corresponding to this sentence. It should be noted that, there is no real physical tool such as a touch pen in the hand of the user; at this moment, the camera acquires the text reading interface displayed on the tablet computer and the pen-hold gesture of the user, thus obtaining the displayed image and the current gesture image. The smart glasses 16 establish feature vectors for the gesture edge contour and the gesture movement trajectory of the pen-hold gesture, respectively, extract eigenvalues from the aforesaid feature vectors to run a match in the gesture database stored in the smart glasses, obtain from the gesture database that a gesture category of a gesture that matches the extracted eigenvalues is a pen-hold marking gesture, thus transmits to the tablet computer a control instruction corresponding to the pen-hold marking gesture. The tablet computer forms an image of a virtual pen 15 within the view field of the smart glasses based on the control instruction of the pen-hold marking gesture, so that a marking can be made at the text corresponding to the pen-hold gesture. It should be noted that, the smart glasses 16 generate the image of the virtual pen 15, so that the user views the image of the virtual pen 15 through the smart glasses 16, wherein an effect view viewed by the user is illustrated in FIG. 6, with the same effect as that achieved by using a real physical tool such as a touch pen.

Next, an implementation of the man-machine interaction with the man-machine interaction system in this embodiment will be explained below in another specific example. The smart glasses use the camera to acquire images, and the display device, which is a tablet computer, displays an image such as a text reading interface or a game interface on the display device. If the user needs to zoom in on the text reading interface or the game interface, the user can make a gesture of holding a magnifier or a gesture of plus sign (+). After the camera acquires the gesture image of holding a magnifier or the plus sign, the smart glasses establish feature vectors for the gesture edge contour and the gesture movement trajectory of the gesture image of holding a magnifier or the gesture image of the plus sign, extract eigenvalues from the aforesaid feature vectors to run a match in the gesture database stored in the smart glasses, obtains that a gesture category of a gesture corresponding to the extracted eigenvalues in the database is a zoom-in gesture, and thus transmit to the tablet computer the control instruction corresponding to the zoom-in gesture. The tablet computer forms an image of a virtual amplifier in the view field of the smart glasses based on the control instruction corresponding to the zoom-in gesture, and zooms in on the text reading interface or the game interface, so that the user can view the image of the virtual amplifier and the amplified text reading interface or the amplified game interface through the smart glasses.

Within the man-machine interaction system in this embodiment, the smart glasses use the gesture edge contour and the gesture movement trajectory to recognize the acquired gestures and run a match, generate a control instruction corresponding to a target gesture, and generate a virtual tool image based on the control instruction; the display device executes the function corresponding to the control instruction, so that man-machine interaction are more accurate and perfect.

Sixth Embodiment

Figure 7:
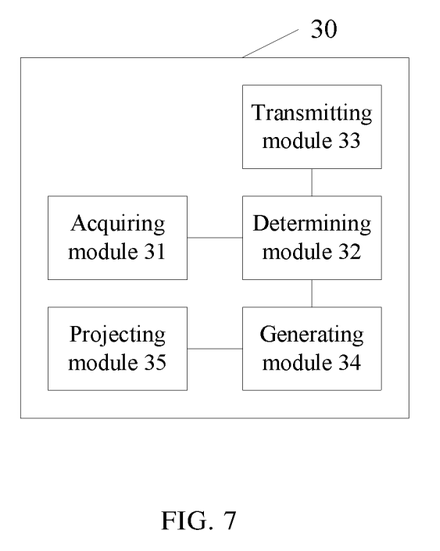
FIG. 7 is a schematic diagram of configuration of a man-machine interaction apparatus in a sixth embodiment of the present disclosure.

Referring to FIG. 7, this embodiment of the present disclosure further provides a man-machine interaction apparatus 30, comprising:

an acquiring module 31 configured to acquire a current gesture image of a user and a display image on the display device;

a determining module 32 configured to determine whether the current gesture image matches with gestures pre-stored in a gesture database, determine a gesture category of a matched gesture, and determine a control instruction corresponding to the gesture category;

a transmitting module 33 configured to transmit the control instruction to the display device so that the display device executes the control instruction;

a generating module 34 configured to generate a virtual tool image corresponding to the control instruction based on the control instruction; and a projecting module 35 configured to project a virtual image that includes the virtual tool image and the display image on the display device.

In the man-machine interaction apparatus 30 provided in the present disclosure, the acquiring module 31 acquires a current gesture image of a user and a display image on the display device; the determining module 32 determines whether the current gesture image matches with gestures pre-stored in a gesture database, determines a gesture category of a matched gesture, and determines a control instruction corresponding to the gesture category; the generating module 34 generates a virtual tool image corresponding to the control instruction; the projecting module 35 projects a virtual image that includes the virtual tool image and the display image on the display device; the transmitting module 33 transmits the control instruction to the display device so that the display device executes the control instruction, thereby achieving the functions corresponding to the control instructions. In comparison to the known solution in which a physical device is required to implement man-machine interaction, the present disclosure can generate control instructions only with the user gesture, and generate a corresponding virtual tool image, so that the user can view a virtual image that includes a virtual tool image and a display image on the display device, and use the control instructions to control the display device to achieve corresponding functions; the man-machine interaction can be implemented by the virtual reality technique without dedicatedly using a physical device to operate the display device, which improves operation convenience for the user to perform man-machine interaction by the virtual reality technique.

Seventh Embodiment

Based on the sixth embodiment, specific operations of the respective modules described above will be illustrated.

The acquiring module 31 is configured to perform a photograph or video-shoot the current gesture image of the user and the display image on the display device to acquire a mixed image that includes the current gesture image and the display image on the display device; and recognize the current gesture image and the display image on the display device from the mixed image, respectively.

The determining module 32 is configured to look up and find a control instruction corresponding to the gesture category based on pre-stored correspondence relationship between the gesture category and the control instruction.

The determining module 32 can also be configured to: obtain a gesture edge contour and a gesture movement trajectory of the current gesture image based on the current gesture image; determine whether the gesture edge contour and the gesture movement trajectory of the current gesture image match a gesture edge contour and a gesture movement trajectory of a pre-stored gesture; if there is a match, determine a gesture category of the pre-stored gesture as the gesture category to which the current gesture image corresponds; if there is no match, determine that a gesture category of the pre-stored gesture is not the gesture category to which the current gesture image corresponds.

The determining module 32 can also be configured to: obtain a gesture edge contour and a gesture movement trajectory of the current gesture image based on the current gesture image to establish a feature vector of the gesture edge contour and a feature vector of the gesture movement trajectory, respectively; extract an eigenvalue of the feature vector corresponding to the gesture edge contour and an eigenvalue of the feature vector corresponding to the gesture movement trajectory; determine whether the eigenvalue of the feature vector corresponding to the gesture edge contour and the eigenvalue of the feature vector corresponding to the gesture movement trajectory match an eigenvalue of the gesture edge contour and an eigenvalue of the gesture movement trajectory of a pre-stored gesture, respectively; if there is a match, it is determined a gesture category of the pre-stored gesture as the gesture category to which the current gesture image corresponds; if there is no match, determining that a gesture category of the pre-stored gesture is not the gesture category to which the current gesture image corresponds.

The respective embodiments in this specification are described by a progressive way, the same or similar portions between the respective embodiments can be referred mutually, and each embodiment emphasizes on its differences than the other embodiments. Embodiments of the man-machine interaction apparatus are described more briefly, since they are similar to embodiments of the man-machine interaction method; as for the relevant contents, reference can be made to the descriptions in the method embodiments.

In the above descriptions of implementations, the specific features, structures, materials, or characteristics can be combined in a proper manner in any one or more embodiments or examples.

The above described merely are specific implementations of the present disclosure, but the protection scope of the present disclosure is not limited thereto; the modification and replacements easily conceivable for those skilled in the art within the technical scope revealed by the present disclosure all fall into the protection scope of the present disclosure. Therefore, the protection scope of the present disclosure is based on the protection scope of the claims.

The present application claims priority of the Chinese Patent Application No. 201610004024.3 filed on Jan. 4, 2016, the entire disclosure of which is hereby incorporated by reference as part of the present application.

What is claimed is:

1. A man-machine interaction system, comprising a wearable device and a display device;
wherein the wearable device comprises an image sensor, a memory, a processor, an image projector, and an information transmission interface;
the image sensor is connected to the processor, and configured to acquire a current gesture image of a user and a display image on the display device;
the processor is connected to the memory, and configured to match the current gesture image with gestures pre-stored in a gesture database in the memory, determine a gesture category of a matched gesture, determine a control instruction corresponding to the gesture category, and generate a virtual tool image corresponding to the control instruction based on the control instruction;
the image projector is connected to the processor, and configured to project a virtual image that includes the virtual tool image and the display image;
the information transmission interface is connected to the processor, and configured to transmit the control instruction to the display device; and
the display device is configured to execute the control instruction upon receipt of the control instruction.

2. The man-machine interaction system of claim 1, wherein the wearable device is smart glasses comprising lenses and a glasses frame for supporting the lenses, and the image projector is integrated in the lenses; the image sensor is arranged on the glasses frame.

3. A man-machine interaction method, comprising:
acquiring, by a wearable device, a current gesture image of a user and a display image on a display device;
matching the current gesture image with gestures pre-stored in a gesture database, determining a gesture category of a matched gesture, and determining a control instruction corresponding to the gesture category;
generating a virtual tool image corresponding to the control instruction based on the control instruction;
projecting a virtual image that includes the virtual tool mage and the display image on the display device; and
transmitting the control instruction to the display device, so that the display device executes the control instruction.

4. The man-machine interaction method of claim 3, wherein acquiring the current gesture image of the user and the display image on the display device comprises:
photographing or video-shooting the current gesture image of the user and the display image on the display device to acquire a mixed image that includes the current gesture image and the display image on the display device; and
recognizing the current gesture image and the display image on the display device from the mixed image, respectively.

5. The man-machine interaction method of claim 3, wherein determining a control instruction corresponding to the gesture category comprises:
looking up and finding the control instruction corresponding to the gesture category based on pre-stored correspondence relationship between the gesture category and the control instruction.

6. The man-machine interaction method of claim 3, wherein matching the current gesture image with the gestures pre-stored in the gesture database, and determining the gesture category of the matched gesture comprises:
obtaining a gesture edge contour and a gesture movement trajectory of the current gesture image based on the current gesture image;
determining whether the gesture edge contour and the gesture movement trajectory of the current gesture image match a gesture edge contour and a gesture movement trajectory of a pre-stored gesture;
if there is a match, determining that a gesture category of the pre-stored gesture as the gesture category to which the current gesture image corresponds;
if there is no match, determining that a gesture category of the pre-stored gesture is not the gesture category to which the current gesture image corresponds.

7. The man-machine interaction method of claim 3, wherein matching the current gesture image with the gestures pre-stored in the gesture database, and determining the gesture category of the matched gesture comprises:
 obtaining the gesture edge contour and the gesture movement trajectory of the current gesture image based on the current gesture image to establish a feature vector of the gesture edge contour and a feature vector of the gesture movement trajectory, respectively;
 extracting an eigenvalue of the feature vector corresponding to the gesture edge contour and an eigenvalue of the feature vector corresponding to the gesture movement trajectory;
 determining whether the eigenvalue corresponding to the gesture edge contour and the eigenvalue corresponding to the gesture movement trajectory match an eigenvalue of the gesture edge contour and an eigenvalue of the gesture movement trajectory of a pre-stored gesture, respectively;
 if there is a match, determining that a gesture category of the pre-stored gesture as the gesture category to which the current gesture image corresponds;
 if there is no match, determining that a gesture category of the pre-stored gesture is not the gesture category to which the current gesture image corresponds.

8. A man-machine interaction apparatus, comprising:
 a sensor configured to acquire a current gesture image of a user and a display image on a display device;
 a processor configured to match the current gesture image with gestures pre-stored in a gesture database, determine a gesture category of a matched gesture, and determine a control instruction corresponding to the gesture category, and generate a virtual tool image corresponding to the control instruction based on the control instruction;
 a projector configured to project a virtual image that includes the virtual tool image and the display image on the display device; and
 an information transmission interface configured to transmit the control instruction to the display device so that the display device executes the control instruction.

9. The man-machine interaction apparatus of claim 8, wherein the sensor is configured to: photograph or videoshoot the current gesture image of the user and the display image on the display device to acquire a mixed image that includes the current gesture image and the display image on the display device; and recognize the current gesture image and the display image on the display device from the mixed image, respectively.

10. The man-machine interaction apparatus of claim 8, wherein the processor is configured to look up and find a control instruction corresponding to the gesture category based on pre-stored correspondence relationship between the gesture category and the control instruction.

11. The man-machine interaction apparatus of claim 8, wherein the processor configured to: obtain a gesture edge contour and a gesture movement trajectory of the current gesture image based on the current gesture image; determine whether the gesture edge contour and the gesture movement trajectory of the current gesture image match a gesture edge contour and a gesture movement trajectory of a pre-stored gesture; if there is a match, determine that the gesture category of the pre-stored gesture as the gesture category to which the current gesture image corresponds; if there is no match, determine that the gesture category of the pre-stored gesture is not the gesture category to which the current gesture image corresponds.

12. The man-machine interaction apparatus of claim 8, wherein the processor is configured to: obtain a gesture edge contour and a gesture movement trajectory of the current gesture image based on the current gesture image to establish a feature vector of the gesture edge contour and a feature vector of the gesture movement trajectory, respectively; extract an eigenvalue of the feature vector corresponding to the gesture edge contour and an eigenvalue of the feature vector corresponding to the gesture movement trajectory; determine whether the eigenvalue corresponding to the gesture edge contour and the eigenvalue corresponding to the gesture movement trajectory match an eigenvalue of the gesture edge contour and an eigenvalue of the gesture movement trajectory of a pre-stored gesture, respectively; if there is a match, the processor is configured to determine that the gesture category of the pre-stored gesture as the gesture category to which the current gesture image corresponds; if there is no match, the processor is configured to determine that the gesture category of the pre-stored gesture is not the gesture category to which the current gesture image corresponds.

13. The man-machine interaction method of claim 4, wherein determining a control instruction corresponding to the gesture category comprises:
 looking up and finding the control instruction corresponding to the gesture category based on pre-stored correspondence relationship between the gesture category and the control instruction.

14. The man-machine interaction method of claim 4, wherein matching the current gesture image with the gestures pre-stored in the gesture database, and determining the gesture category of the matched gesture comprises:
 obtaining a gesture edge contour and a gesture movement trajectory of the current gesture image based on the current gesture image;
 determining whether the gesture edge contour and the gesture movement trajectory of the current gesture image match a gesture edge contour and a gesture movement trajectory of a pre-stored gesture;
 if there is a match, determining that a gesture category of the pre-stored gesture as the gesture category to which the current gesture image corresponds;
 if there is no match, determining that a gesture category of the pre-stored gesture is not the gesture category to which the current gesture image corresponds.

15. The man-machine interaction method of claim 4, wherein matching the current gesture image with the gestures pre-stored in the gesture database, and determining the gesture category of the matched gesture comprises;
 obtaining the gesture edge contour and the gesture movement trajectory of the current gesture image based on the current gesture image to establish a feature vector of the gesture edge contour and a feature vector of the gesture movement trajectory, respectively;
 extracting an eigenvalue of the feature vector corresponding to the gesture edge contour and an eigenvalue of the feature vector corresponding to the gesture movement trajectory;
 determining whether the eigenvalue corresponding to the gesture edge contour and the eigenvalue corresponding to the gesture movement trajectory match an eigenvalue of the gesture edge contour and an eigenvalue of the gesture movement trajectory of a pre-stored gesture, respectively;
 if there is a match, determining that a gesture category of the pre-stored gesture as the gesture category to which the current gesture image corresponds;

if there is no match, determining that a gesture category of the pre-stored gesture is not the gesture category to which the current gesture image corresponds.

16. The man-machine interaction apparatus of claim 9, wherein the processor is configured to look up and find a control instruction corresponding to the gesture category based on pre-stored correspondence relationship between the gesture category and the control instruction.

17. The man-machine interaction apparatus of claim 9, wherein the processor configured to: obtain a gesture edge contour and a gesture movement trajectory of the current gesture image based on the current gesture image; determine whether the gesture edge contour and the gesture movement trajectory of the current gesture image match a gesture edge contour and a gesture movement trajectory of a pre-stored gesture; if there is a match, determine that the gesture category of the pre-stored gesture as the gesture category to which the current gesture image corresponds; if there is no match, determine that the gesture category of the pre-stored gesture is not the gesture category to which the current gesture image corresponds.

18. The man-machine interaction apparatus of claim 9, wherein the processor is configured to: obtain a gesture edge contour and a gesture movement trajectory of the current gesture image based on the current gesture image to establish a feature vector of the gesture edge contour and a feature vector of the gesture movement trajectory, respectively; extract an eigenvalue of the feature vector corresponding to the gesture edge contour and an eigenvalue of the feature vector corresponding to the gesture movement trajectory; determine whether the eigenvalue corresponding to the gesture edge contour and the eigenvalue corresponding to the gesture movement trajectory match an eigenvalue of the gesture edge contour and an eigenvalue of the gesture movement trajectory of a pre-stored gesture, respectively; if there is a match, the processor is configured to determine that the gesture category of the pre-stored gesture as the gesture category to which the current gesture image corresponds; if there is no match, the processor is configured to determine that the gesture category of the pre-stored gesture is not the gesture category to which the current gesture image corresponds.

* * * * *